(12) United States Patent
Harris et al.

(10) Patent No.: US 11,560,332 B2
(45) Date of Patent: Jan. 24, 2023

(54) GLASS-BASED ARTICLES WITH ENGINEERED STRESS PROFILES AND METHODS OF MANUFACTURE

(71) Applicant: CORNING INCORPORATED, Corning, NY (US)

(72) Inventors: Jason Thomas Harris, Horseheads, NY (US); Vijay Subramanian, Painted Post, NY (US); Wei Xu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 168 days.

(21) Appl. No.: 16/337,137

(22) PCT Filed: Sep. 25, 2017

(86) PCT No.: PCT/US2017/053198
§ 371 (c)(1),
(2) Date: Mar. 27, 2019

(87) PCT Pub. No.: WO2018/063966
PCT Pub. Date: Apr. 5, 2018

(65) Prior Publication Data
US 2019/0225538 A1    Jul. 25, 2019

Related U.S. Application Data

(60) Provisional application No. 62/400,228, filed on Sep. 27, 2016.

(51) Int. Cl.
*C03C 21/00* (2006.01)
*C03C 17/22* (2006.01)
*C03C 17/23* (2006.01)

(52) U.S. Cl.
CPC ............ *C03C 21/002* (2013.01); *C03C 17/22* (2013.01); *C03C 17/225* (2013.01); *C03C 17/23* (2013.01);
(Continued)

(58) Field of Classification Search
None
See application file for complete search history.

(56) References Cited

U.S. PATENT DOCUMENTS 3,287,200 A * 11/1966 Hess ...................... C03B 27/03
428/410
6,516,634 B1    2/2003 Green et al.
(Continued)

FOREIGN PATENT DOCUMENTS

TW    201522271 A    6/2015
TW    201605614 A    2/2016
(Continued)

OTHER PUBLICATIONS

Glass et al; "New Glass Technologies for Enhanced Architectural Surety®: Engineered Stress Profiles (ESP) in Soda-Lime-Silica Glass"; Sandia National Laboratories; 37 Pages; 2000.
(Continued)

*Primary Examiner* — David Sample
(74) *Attorney, Agent, or Firm* — Jeffrey A. Schmidt (57) ABSTRACT

Strengthened glass-based substrates having a first outer region compressive stress and a first side having first coating thereon are disclosed. The first coating comprising a material selected to have a first coating Young's modulus value, a first coating thickness, and a first coating stress that is either neutral or compressive, such that the absolute value of first outer region compressive stress is greater than the absolute value of the first coating stress. Methods of making glass-based articles are provided, and glass-based articles
(Continued)

having coatings that provide different strength values and/or reliability on different sides of the glass-based articles are also disclosed.

14 Claims, 7 Drawing Sheets

(52) U.S. Cl.
CPC .. *C03C 2217/213* (2013.01); *C03C 2217/214* (2013.01); *C03C 2217/228* (2013.01); *C03C 2217/231* (2013.01); *C03C 2217/281* (2013.01); *C03C 2217/425* (2013.01); *C03C 2217/78* (2013.01)

(56) References Cited

U.S. PATENT DOCUMENTS

| | | | | |
|---|---|---|---|---|
| 10,590,033 B2* | 3/2020 | Paulson | ................... | C03C 17/23 |
| 2005/0084679 A1 | 4/2005 | Sglavo et al. | | |
| 2010/0089451 A1* | 4/2010 | Harimoto | .............. | C23C 18/127 |
| | | | | 106/286.6 |
| 2014/0090864 A1* | 4/2014 | Paulson | .................. | B32B 17/06 |
| | | | | 174/50 |
| 2014/0220327 A1* | 8/2014 | Adib | ....................... | C03C 17/36 |
| | | | | 428/217 |
| 2015/0037554 A1 | 2/2015 | Gao et al. | | |
| 2015/0323705 A1* | 11/2015 | Hart | ......................... | G02B 1/14 |
| | | | | 359/580 |
| 2016/0060161 A1 | 3/2016 | Ellison et al. | | |
| 2016/0107928 A1 | 4/2016 | Bayne et al. | | |

FOREIGN PATENT DOCUMENTS

| | | | |
|---|---|---|---|
| TW | 201620852 A | 6/2016 | |
| TW | 201623177 A | 7/2016 | |
| WO | WO-2013065648 A1 * | 5/2013 | ........... C03C 21/002 |

OTHER PUBLICATIONS

International Search Report and Written Opinion of the International Searching Authority; PCT/US2017/053198; dated Mar. 12, 2018; European Patent Office.
Invitation to Pay Additional Fees From the International Searching Aurhtority; PCT/US2017/053198; Mailed Jan. 9, 2018; 9 Pages; European Patent Office.
Sglavo et al, "Flaw-Insensitive Ion-Exchanged Glass: II, Production and Mechanical Performance", J. Am. Ceram. Soc., 84, [8]; pp. 1832-1838, 2001.
Sglavo et al; "Flaw-Insensitive Ion-Exchanged Glass: I, Theoretical Aspects", J. Am. Ceram. Soc., 84, [8] pp. 1827-1831, 2001.
Taiwanese Patent Application No. 106132365, Search Report dated Oct. 19, 2020, 1 Page (English Translation Only); Taiwanese Patent Office.

* cited by examiner

GLASS-BASED ARTICLES WITH ENGINEERED STRESS PROFILES AND METHODS OF MANUFACTURE

CROSS-REFERENCE TO RELATED APPLICATIONS

This application is a national stage entry of International Patent Application Serial No. PCT/US2017/053198, filed on Sep. 25, 2017, which in turn, claims the benefit of priority under 35 U.S.C. § 119 of U.S. Provisional Application Ser. No. 62/400,228 filed on Sep. 27, 2016, the contents of each of which are relied upon and incorporated herein by reference in their entireties.

FIELD

Embodiments of the disclosure generally relate to glass-based articles having engineered stress profiles and methods for manufacturing the same.

BACKGROUND

Strengthened glass-based articles are widely used in electronic devices as cover plates or windows for portable or mobile electronic communication and entertainment devices, such as mobile phones, smart phones, tablets, video players, information terminal (IT) devices, laptop computers, navigation systems and the like, as well as in other applications such as architecture (e.g., windows, shower panels, countertops etc.), transportation (e.g., automotive, trains, aircraft, sea craft, etc.), appliance, or any application that requires superior fracture resistance but thin and lightweight articles.

In strengthened glass-based articles, such as chemically strengthened glass articles, compressive stress is highest or at a peak at the glass surface and reduces from a peak value moving away from the surface, and there is zero stress at some interior location of the glass article before the stress in the glass article becomes tensile. For glass articles having such a stress profile, a Weibull plot can be obtained for a certain Weibull modulus that indicates the spread of load to failure in biaxial testing. A higher Weibull modulus is in general attractive as the spread of loads to failure for different samples of glass articles will be tighter, thereby increasing product reliability. In other words, the product will be less sensitive to initial flaw size distributions, including those from handling.

Modifications to ion exchange processes can be used to modify the stress profile of the glass-based article to decrease sensitivity to initial flaw populations. While modifications to ion exchange processes can be used for this purpose, as strengthened glasses are increasingly being utilized, it has become more important to develop other methods to provide strengthened glass materials having improved reliability, while not significantly impacting mean strength of the strengthened glass.

SUMMARY

A first aspect of the disclosure pertains to a glass-based article, the glass-based article comprising a glass-based substrate having a first side having a first coating thereon, a first interface between the first coating and the glass-based substrate, and a second side opposite the first side, the first coating having a first coating thickness extending from a first surface to the first interface, and the glass-based substrate having a substrate thickness extending from the first interface to a second surface, the glass-based substrate having a first outer region extending from the first interface to a depth of compression (hereinafter "DOC"), the first outer region having an absolute value of first outer region compressive stress, the first coating comprising a material selected to have a first coating Young's modulus value, a first coating stress that is either neutral or compressive, and the absolute value of first outer region compressive stress is greater than the absolute value of the first coating stress.

Another aspect of the disclosure pertains to A glass-based article comprising a glass-based substrate having a substrate Young's modulus, a first side and a second side, the first side having a first side outer region having a compressive stress extending to a first DOC, a central region having a tensile stress and the second side having a second side outer region opposite the first side outer region, the second side outer region having a compressive stress extending to a second DOC; a first coating on the first side, a first interface between the first coating and the glass-based substrate, the first coating having a first coating thickness and a first coating Young's modulus such that the first side has a first side strength and a first side mechanical reliability; and a second coating on the second side, a second interface between the second coating and the glass-based substrate, the second coating having a second coating thickness and a second coating Young's modulus such that the second side has a second side strength and a second side mechanical reliability, the first side strength being different than the second side strength and the first side mechanical reliability being different than the second side mechanical reliability.

Another aspect of the disclosure pertains to a method of changing mechanical reliability of a glass-based article comprising: determining a critical flaw size of a glass-based substrate, the critical flaw size determining mechanical reliability and strength of the glass-based substrate, the glass-based substrate having a substrate Young's modulus, a substrate strength and a substrate mechanical reliability, a first surface, a substrate thickness and a first side outer region having a compressive stress extending from a first side surface to a first DOC, a central region having a tensile stress, and a second side outer region having a compressive stress extending from a second side surface to a second DOC; selecting a first coating material having a first coating Young's modulus that is different than the glass-based substrate Young's modulus; determining, based upon the first coating Young's modulus and the glass-based substrate Young's modulus, a calculated first coating thickness that increases one of the glass-based substrate mechanical reliability on the first side or the glass-based substrate mechanical strength on the first side; and applying the first coating at the calculated first coating thickness to increase either the glass-based substrate mechanical reliability on the first side or the glass-based substrate mechanical strength on the first side.

Another aspect of the disclosure pertains to a method for forming a glass-based article having a desired strength, the method comprising determining a maximum expected flaw size in the glass-based article in the absence of a coating; determining a coating thickness value and a coating Young's modulus value corresponding to the maximum expected flaw size in the glass-based article when the coating is placed on the glass-based article; selecting a coating having the Young's modulus value and the thickness value that provides the desired strength and a desired mechanical reliability for the glass-based article when the coating is applied thereto; and applying the coating to the glass-based article.

It is to be understood that both the foregoing general description and the following detailed description present embodiments of the disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description, serve to explain the principles and operations thereof.

DETAILED DESCRIPTION

Before describing several exemplary embodiments, it is to be understood that the disclosure is not limited to the details of construction or process steps set forth in the following disclosure. The disclosure provided herein is capable of other embodiments and of being practiced or being carried out in various ways. In the following detailed description, for purposes of explanation and not limitation, example embodiments disclosing specific details are set forth to provide a thorough understanding of various principles and aspects. However, it will be apparent to one having ordinary skill in the art, having had the benefit of the present disclosure, that the claimed subject matter may be practiced in other embodiments that depart from the specific details disclosed herein. Moreover, descriptions of well-known devices, methods and materials may be omitted so as not to obscure the description of various principles set forth herein. Finally, wherever applicable, like reference numerals refer to like elements.

Directional terms as used herein—for example up, down, right, left, front, back, top, bottom—are made only with reference to the figures as drawn and are not intended to imply absolute orientation.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics (including those described in different embodiments) may be combined in any suitable manner (including in any and all combinations) in one or more embodiments.

One or more embodiments of the disclosure provide glass-based articles with engineered stress profiles including a coating. In one or more embodiments, the coating comprises material with the same, lower, or higher Young's modulus than the strengthened glass-based substrate applied on one or both sides of the strengthened glass-based substrate. According to one or more embodiments, the coating has no residual stress or a compressive residual stress. For the case in which the coating has no residual stress, an overall stress profile of the glass-based article with the coating is similar to a stress profile that is obtained by shifting an ion-exchange profile by a certain distance into the glass-based article, with the outer region of the glass-based article having no compression. This configuration, according to modeling and some preliminary experimental data, will be less sensitive to initial glass flaws compared to the case in which the original chemically strengthened glass-based substrate has no coating and about the same mean strength.

According to one or more embodiments, chemically strengthened glass-based articles are provided which are less sensitive to initial flaws. In one or more embodiments, the glass-based articles described herein have a higher reliability and a more consistent product performance and will exhibit lower variability in strength compared to existing products that do not including a coating thereon.

According to one or more embodiments, a coating on one or both sides of a glass-based substrate or article can improve reliability for thin glass-based articles (e.g., having a thickness of less than or equal to about 1 mm) and for thicker glass-based articles by adjusting the coating parameters. Furthermore, according to one or more embodiments, properties of the coating(s) such as thickness and Young's modulus can be tuned to allow flaws to grow to a predetermined length, which can be determined through modeling, which in turn can allow for glass-based articles having engineered stress profiles resulting in a glass-based article that (i) has a low sensitivity to the initial flaw population; (ii) has a high reliability; (iii) has consistent product performance; and/or (iv) has low variability in strength. In an embodiment, the strength and reliability of glass-based articles can be precisely tuned by the choices of coating Young's modulus and coating thickness. In one or more embodiments, glass-based articles can be provided that have a different reliability on opposite sides of the glass-based article by selection of coating parameters to have different parameters on different sides of the glass-based article. In an embodiment, glass-based articles provided herein are suitable for safety applications, where the product is designed to have consistent performance, with a pre-determined and known, observable flaw before failure of the glass-based article under load.

Figure 1:
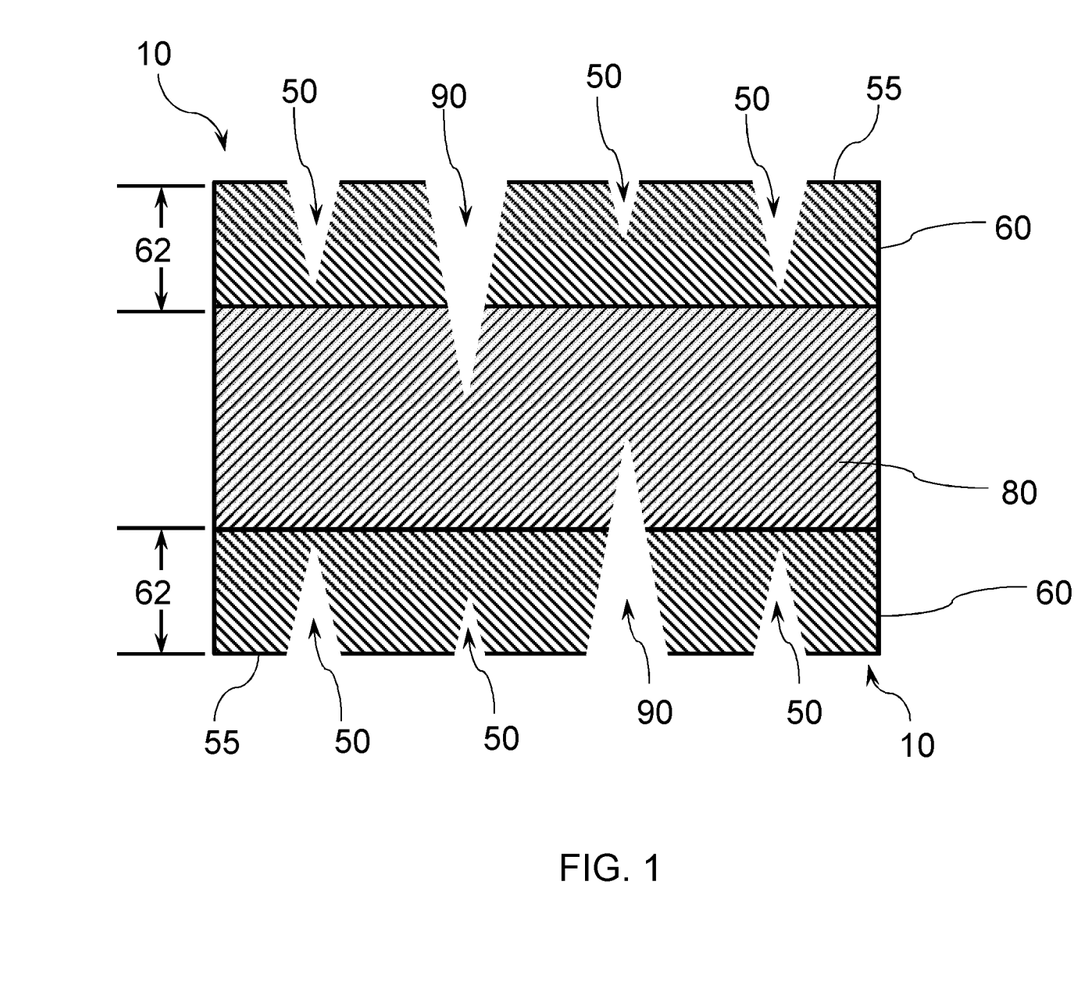
FIG. 1 illustrates a cross-sectional view of a glass-based substrate with a surface having a plurality of cracks.

FIG. 1 illustrates an exemplary strengthened glass-based substrate 10 having a plurality of cracks, illustrating how subsurface damage can result in a failure. Compressive stress regions 60 extending from an outer surfaces 55 of the glass-based substrate 10 to a DOC DOC 62 are under a compressive stress (CS). Cracks 50 in the compressive stress region 60 of the exemplary strengthened glass-based substrate 10 that do not extend into the central tension region 80 of the glass are shown, along with cracks 90 that penetrate into the central tension regions 80 of the glass, which are regions under tensile stress or central tension (CT). Although the incorporation of a CS in a near surface region of the glass can inhibit crack propagation and failure of the glass-based substrate, if the damage extends beyond the DOC 62, and if the CT is of a high enough magnitude, the flaw will propagate over time until it reaches the materials critical stress intensity level (fracture toughness) and will ultimately fracture the glass.

Figure 2A:
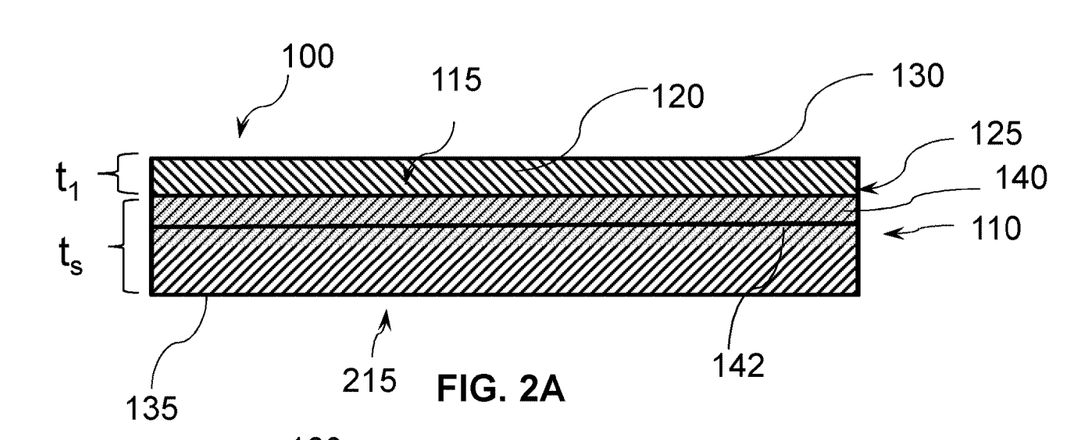
FIG. 2A illustrates a strengthened glass-based substrate having a coating on one side, according to some embodiments.

Referring now to FIG. 2A, a first embodiment of the disclosure pertains to a glass-based article 100, for example, a glass-based article comprising a glass-based substrate 110 having a first side 115, a second side 215 opposite the first side 115. A first coating 120 is disposed on the first side 115, and a first interface 125 is disposed between the first coating and the first side of the glass-based substrate 110. The first coating 120 has a first coating thickness $t_1$ extending from a first surface 130 to the first interface 125. The glass-based substrate 110 having a substrate thickness $t_s$ extending from the first interface 125 to a second surface 135, and having a first outer region 140 extending from the first interface 125 to a DOC DOC 142. According to a first embodiment, the first outer region 140 has an absolute value of first outer region compressive stress. The first coating 120 is comprised of a material selected to have a first coating Young's modulus value, a first coating thickness $t_1$ and a first coating stress that is either neutral or compressive, such that the absolute value of first outer region compressive stress is greater than the absolute value of the first coating stress. Neutral stress refers to zero stress or absence of compressive stress and absence of tensile stress. For glass substrates, Young's modulus typically is in the range of from about 60 GPa to about 80 GPa. The Young's modulus of glass-ceramic articles typically is in the range of from about 60 to about 120 GPa, and in some embodiments may be greater than about 120 GPa.

In a second embodiment, the first embodiment further is characterized such that the absolute value of the first coating stress is at least about 40% less than the absolute value of first outer region compressive stress. In a third embodiment, the glass-based article of the first embodiment is further characterized such that the absolute value of the first coating stress is at least about 50% less than the absolute value of first outer region compressive stress.

According to a fourth embodiment, any of the first through the third embodiments are further characterized in that the glass-based substrate has a substrate Young's modulus value which is different than the first coating Young's modulus value. According to a fifth embodiment, any of the first through the third embodiments are further characterized in that the glass-based substrate has a substrate Young's modulus value which is less than or equal to the first coating Young's modulus value.

According to a sixth embodiment, any of the first through the fifth embodiments are further characterized in that the first coating Young's modulus value is selected such that the first coating improves mechanical reliability of the glass-based article. According to a seventh embodiment any of the first through the sixth embodiments are further characterized in that the first coating thickness is in a range of from about 5 nanometers to about 5 micrometers (hereinafter microm-eters, microns or µm). According to an eighth embodiment, any of the first through the sixth embodiments are further characterized in that the first coating thickness is in a range of from about 10 nanometers to about 2 micrometers.

According to a ninth embodiment, any of the first through the eighth embodiments are further characterized in that the first coating is selected from the group consisting of silica, indium tin oxide, aluminum oxynitride, porous silica, a glass-ceramic or a ceramic. According to a tenth embodiment, any of the first through the ninth embodiments are further characterized in that the glass-based article comprises a strengthened glass-based substrate selected from the group consisting of a laminated glass-based substrate, a chemically strengthened glass-based substrate, a thermally strengthened glass-based substrate, and combinations thereof.

According to an eleventh embodiment, any of the first through the tenth embodiments are further characterized in that the glass-based substrate comprises an ion exchangeable alkali aluminosilicate glass composition. According to a twelfth embodiment, any of the first through the tenth embodiments are further characterized in that the glass-based substrate comprises an ion exchangeable alkali aluminoborosilicate glass composition.

In a thirteenth embodiment, any of the first through the twelfth embodiments are further characterized in that the glass-based substrate comprises a chemically strengthened glass-based substrate having a thickness $t_s$, with ions exchanged in the first outer region to a DOC in a range of from about 0.05 $t_s$ to about 0.25 $t_s$ from the first interface. In a fifteenth embodiment, the fourteenth embodiment is further characterized in that the first outer region has a compressive stress (CS) magnitude in a range of from about 100 MPa to about 1100 MPa. In a fifteenth embodiment, the fourteenth embodiment is further characterized in that the CS is in a range of from about 600 MPa to about 1000 MPa.

Figure 2B:
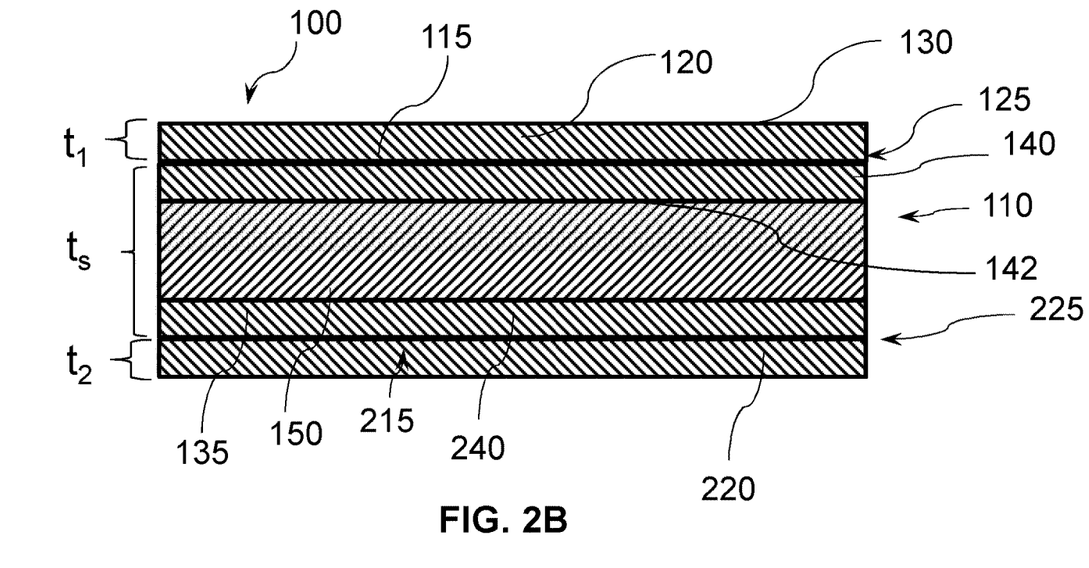
FIG. 2B illustrates a strengthened glass-based substrate having a coating on two sides, according to some embodiments.

Referring now to FIG. 2B, in a sixteenth embodiment, any of the first through fifteenth embodiments can be further characterized in that the glass-based substrate has a central region 150 and a second outer region 240. The central region 150 has a tensile stress, and extends from the DOC 142 to the second outer region 240. The second outer region 240 has a stress that is either neutral or compressive. In a seventeenth embodiment, the glass-based article of the sixteenth embodiment further comprises a second coating 220 on the second outer region 240 to provide a second interface 225 at the second outer region 240 and the second coating 220. The second coating 220 comprises a material having a second coating Young's modulus value, a second coating thickness $t_2$, and a second coating stress that is either neutral or compressive. The absolute value of the second outer region compressive stress is greater than the absolute value of the second coating stress.

In an eighteenth embodiment, the glass-based article of the seventeenth embodiment further is characterized in that the absolute value of the second coating stress is at least about 40% less than the absolute value of second outer region compressive stress. In an nineteenth embodiment, the glass-based article of the seventeenth embodiment further is characterized in that the absolute value of second coating stress is at least about 50% less than the absolute value of the second outer region compressive stress.

In a twentieth embodiment, the glass-based article of any of the seventeenth through nineteenth embodiments further is characterized such that the glass-based substrate has a substrate Young's modulus value which is different than the second coating Young's modulus value. In a twenty-first embodiment, the glass-based article of any of the seventeenth through nineteenth embodiments further is characterized such that the glass-based substrate has a substrate Young's modulus value which is less than the second coating Young's modulus value.

In a twenty-second embodiment, the glass-based article of any of the seventeenth through twenty-first embodiments are further characterized in that the first coating Young's modulus value is selected such that the first coating improves mechanical reliability of the glass-based article on the first side. In a twenty-third embodiment, the glass-based article of any of the seventeenth through twenty-first embodiments are further characterized in that the first side 115 and the second side of the glass-based substrate 215 have different strength and reliability values resulting from the first coating 120 and second coating 220.

In a twenty-fourth embodiment, the twenty-third embodiment is further characterized in that the first side 115 has a higher strength than the second side 215 and the first side 115 has a lower mechanical reliability than the second side 215. In a twenty-fifth embodiment, the twenty third embodiment is further characterized in that the first side 115 has a lower strength than the second side 215 and the first side 115 has a higher mechanical reliability than the second side 215.

A twenty-sixth embodiment pertains to a glass-based article comprising a glass-based substrate having a substrate Young's modulus, a first side and a second side. The first side has a first side outer region having a compressive stress extending to a first DOC. A central region has a tensile stress. The second side has a second side outer region opposite the first side outer region, the second side outer region having a compressive stress extending to a second DOC. A first coating is disposed on the first side and provides a first interface between the first coating and the glass-based substrate. The first coating has a first coating thickness and a first coating Young's modulus such that the first side has a first side strength and a first side mechanical reliability. A second coating is disposed on the second side and provides a second interface between the second coating and the glass-based substrate. The second coating has a second coating thickness and a second coating Young's modulus such that the second side has a second side strength and a second side mechanical reliability. The first side strength is different than the second side strength, and the first side mechanical reliability is different than the second side mechanical reliability.

In a twenty-seventh embodiment, the twenty-sixth embodiment is further characterized in that the first side strength is less than or equal to the second side strength, and the first side mechanical reliability is greater than the second side mechanical reliability. In a twenty eighth embodiment, the twenty-sixth embodiment is further characterized in that the first side strength is greater than the second side strength and the first side mechanical reliability is less than the second side mechanical reliability. In a twenty-ninth embodiment, the glass-based article of any of embodiments twenty-six through twenty-eight can be further characterized in that the first coating thickness is in a range of from about 5 nanometers to about 5 micrometers and the second coating thickness is in a range of from about 5 nanometers to about 5 micrometers. In a thirtieth embodiment, any of embodiments twenty-six through twenty-eight can be further characterized in that the first coating thickness is in a range of from about 10 nanometers to about 2 micrometers, and the second coating thickness is in a range of from about 10 nanometers to about 2 micrometers.

In a thirty-first embodiment, any of embodiments twenty-six through thirty can be further characterized in that the first coating and second coating are selected from the group consisting of silica, indium tin oxide, aluminum oxynitride, porous silica, glass-ceramic, ceramic, or combinations thereof. In a thirty-second embodiment, any of embodiments twenty-six through thirty-one can be further characterized in that the glass-based article comprises a strengthened glass-based substrate selected from the group consisting of a laminated glass substrate, a chemically strengthened glass substrate, a thermally strengthened glass substrate, and combinations thereof. In a thirty-third embodiment, any of embodiments twenty-six through thirty-one can be further characterized in that the glass-based substrate comprises an ion exchangeable alkali aluminosilicate glass composition. In a thirty-fourth embodiment, any of embodiments twenty-six through thirty-one can be further characterized in that the glass-based substrate comprises an ion exchangeable alkali aluminoborosilicate glass composition.

In a thirty-fifth embodiment, any of embodiments twenty-six through thirty-one can be further characterized in that the glass-based substrate comprises a chemically strengthened glass substrate with ions exchanged in the first side outer region to the first DOC in a range of about 10 micrometers to about 90 micrometers from the first interface.

In a thirty-sixth embodiment, the thirty-fifth is embodiment is further characterized in that the first side outer region has a compressive stress (CS) magnitude in a range of from about 100 MPa to about 1100 MPa. In a thirty-seventh embodiment, the thirty-sixth embodiment is further characterized in that the CS is in a range of from about 600 MPa to about 1000 MPa. In a thirty-eighth embodiment, the glass-based article of any of embodiments 1-37 is disposed in one of a handheld portable electronic device having a display screen, an architectural glass substrate, a vehicle interior glass substrate, and an appliance glass substrate.

A thirty-ninth embodiment pertains to a method of changing mechanical reliability of a glass-based article. The method comprises determining a critical flaw size for a glass-based substrate, the critical flaw size determining mechanical reliability and strength of the glass-based substrate. The glass-based substrate having a substrate Young's modulus, a substrate strength, a substrate mechanical reliability, a first surface, a substrate thickness, a first side outer region having a compressive stress extending from a first side surface to a first DOC, a central region having a tensile stress, and a second side outer region having a compressive stress extending from a second side surface to a second DOC. The method further includes disposing a first coating on the first surface. The first coating material has a first coating Young's modulus that is different than the glass-based substrate Young's modulus. Determining, based upon the first coating Young's modulus and the glass-based substrate Young's modulus, a calculated first coating thickness that increases one of the glass-based substrate mechanical reliability on the first side or the glass-based substrate mechanical strength on the first side, and applying the first coating at the calculated first coating thickness to increase either the glass-based substrate mechanical reliability on the first side or the glass-based substrate mechanical strength on the first side.

In a fortieth embodiment, the method of the thirty-ninth embodiment further comprises: selecting a second coating material having a second coating Young's modulus that is different than the glass-based substrate Young's modulus; determining, based upon the second coating Young's modulus and the glass-based substrate Young's modulus, a calculated second coating thickness that increases one of the glass-based substrate mechanical reliability on the second side or the glass-based substrate mechanical strength on the second side, and applying the second coating at the calculated second coating thickness to increase either the glass-based substrate mechanical reliability on the second side or the glass-based substrate mechanical strength on the second side. In a forty-first embodiment, the method of the fortieth embodiment further comprises selecting coating materials and thicknesses to that the glass-based substrate mechanical reliability on the first side and the glass-based substrate mechanical reliability on the second side are different. In a forty-second embodiment, the method of the fortieth embodiment further comprises selecting coating materials and thicknesses to that the glass-based substrate strength on the first side and the glass-based substrate strength on the second side are different.

A forty-third embodiment pertains to a method for forming a glass-based article having a desired strength, the method comprising determining a maximum expected flaw size in the glass-based article in the absence of a coating; determining a coating thickness value and a coating Young's modulus value corresponding to the maximum expected flaw size in the glass-based article when the coating is placed on the glass-based article; selecting a coating having the Young's modulus value and the thickness value that provides the desired strength and a desired mechanical reliability for the glass-based article when the coating is applied thereto; and applying the coating to the glass-based article.

According to a forty fourth embodiment, there is provided a consumer electronic product, comprising:

a housing having a front surface, a back surface and side surfaces;

electrical components provided at least partially within the housing, the electrical components including at least a controller, a memory, and a display, the display being provided at or adjacent the front surface of the housing; and a cover glass disposed over the display, at least one of a portion of the housing or the cover glass comprises the glass-based article of any one of embodiments 1-37.

Figure 3A:
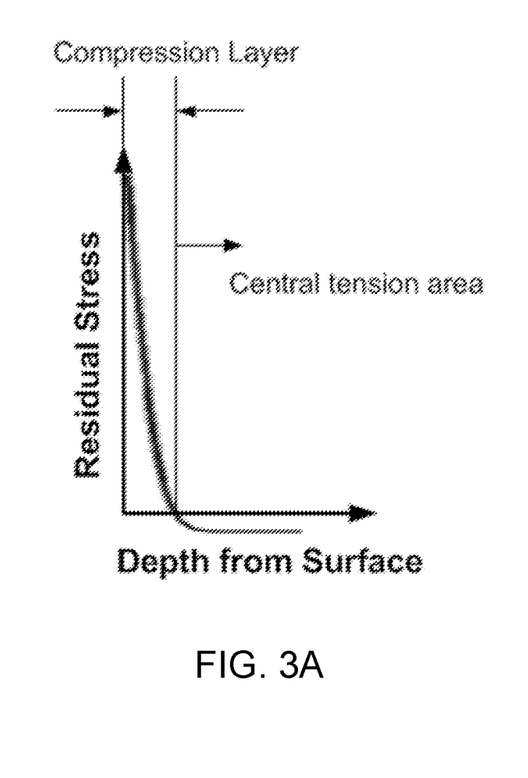
FIG. 3A illustrates a stress profile of a glass-based substrate prior to coating.
Figure 3B:
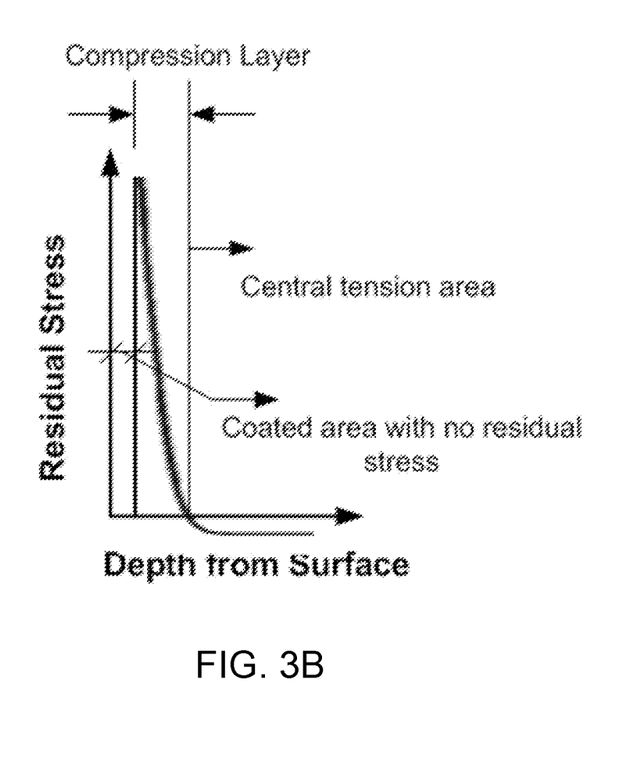
FIG. 3B illustrates a stress profile a glass-based substrate having a coating, according to some embodiments.

Thus, according to one or more embodiments, by selection and application of a coating having a targeted Young's modulus and thickness with respect to the underlying glass-based article, the strength and reliability of glass-based articles can be precisely tuned, and glass-based materials can be provided that have an engineered and predictable failure behavior. FIG. 3A shows a stress profile of a chemically strengthened glass-based article, having a compression layer or first region under compressive stress, and further from the surface in depth, a central tension region. The stress profile shows that article having a peak or maximum residual stress at the surface of the article. FIG. 3B shows an engineered stress profile in accordance with one or more embodiments, where a coating is provided that provides a coated area with no residual stress at the surface of the article.

Figure 4:
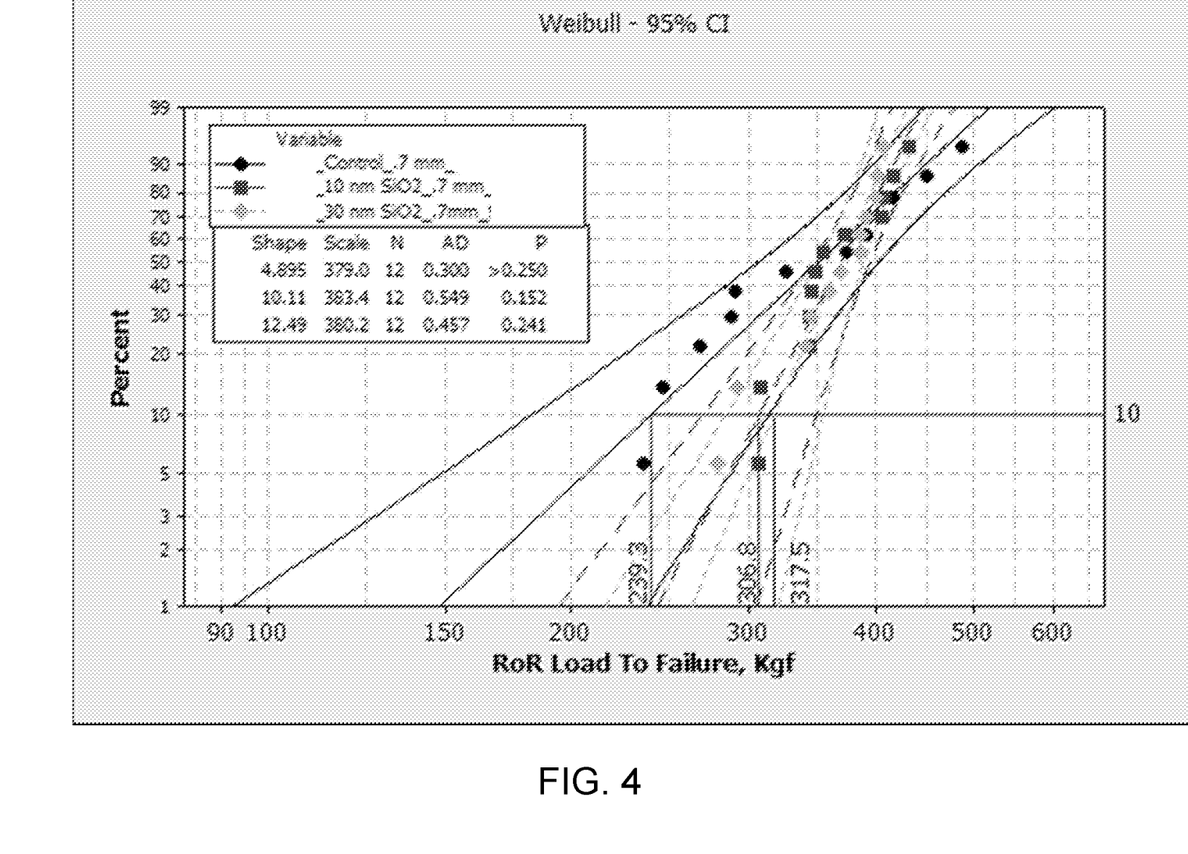
FIG. 4 illustrates a Weibull plot showing data for uncoated and coated glass-based substrates, according to some embodiments.

FIG. 4 shows experimental data demonstrating increased reliability (Weibull modulus) for an ion-exchanged glass with a layer of silica. FIG. 4 demonstrates the effect of the application of coatings on the strength and reliability of chemically strengthened glass. The control sample was a chemically strengthened glass-based substrate having a thickness of 0.7 mm and no coating thereon (dark circular data points). Glass-based substrates made from the same glass as the control were then coated with silica coatings having a thickness of 10 nm (square data points) and 30 nm (light grey diamond data points). As shown in FIG. 4, the samples with the coatings have approximately the same strength (for example see the B10 values of about 307 Kgf for the 10 nm thick coating, and about 318 Kgf for the 30 nm coating) as uncoated chemically strengthened glass (see the B10 value of about 239 Kgf for the uncoated sample), but much higher reliability as evidenced by the steeper slope and tighter distribution (smaller spread between boundary lines) on the Weibull plot. For example, looking at FIG. 4, at the B10 line, the spread between the high and low boundary lines (solid lines) on the uncoated sample are at about 175 Kgf and about 310 Kgf, evidencing a spread of about 135 Kgf. On the other hand, at the B10 line, the spread between the high and low boundary lines (long-dashed, black) on the 10 nm thick coating are at about 280 Kgf and about 325 Kgf, evidencing a spread of about 45 Kgf, considerably smaller than the 135 Kgf spread for the uncoated sample. Similarly to that for the 10 nm thick coating, the 30 nm thick coating, at the B10 line, had a spread between the high and low boundary lines (short-dashed, gray) of about 290 Kgf to about 325 Kgf, evidencing a spread of about 35 Kgf, considerably smaller than the 135 Kgf spread for the uncoated sample, but similar to the 45 Kgf spread of the 10 nm thick coating. The foregoing 10 nm and 30 nm thick silica coatings had a Young's Modulus similar to that of the underlying glass. On the other hand, the addition of a high stiffness coating (Young's Modulus, for example, about 130 GPa) reduces the strength, but increases the reliability.

In one or more embodiments, a coating made of a material having the same, higher, or lower, Young's modulus as the glass-based substrate is deposited onto one or both sides of a strengthened glass-based substrate, for example, a chemically strengthened glass-based substrate strengthened by ion exchange. The coating may be the same on both sides, but need not be. The coating can be deposited by a variety of techniques, including, but not limited to, Physical Vapor Deposition (PVD), sputtering deposition, hybrid physical-chemical vapor deposition (HPCVD), ion plating, chemical vapor deposition (CVD), plasma enhanced CVD (PECVD). For a particular method, by changing the deposition parameters, different material properties can be achieved, including the Young's modulus. A silica coating has substantially the same elastic modulus as most glass-based substrates and, therefore, silica is a good candidate coating material, although other coating materials are also possible. In one or more embodiments, the coating thickness is in a range of 5 nm and 5 micrometers, for example, 10 nm and 2 micrometers. When the glass-based substrate is an ion-exchanged glass, the processing temperature for applying the coating should be such that the existing ion-exchange stress profile is not affected. Thus, the coated product would likely have about the same average strength as the original ion-exchanged glass-based substrate but would now have a higher Weibull modulus, thereby evidencing less sensitivity to the initial flaw population in the glass.

In one or more embodiments, glass-based articles and methods are provided that involve creating a compressive residual stress in the coating which improves the mean strength of the glass-based article while also achieving a higher Weibull modulus.

Figure 5:
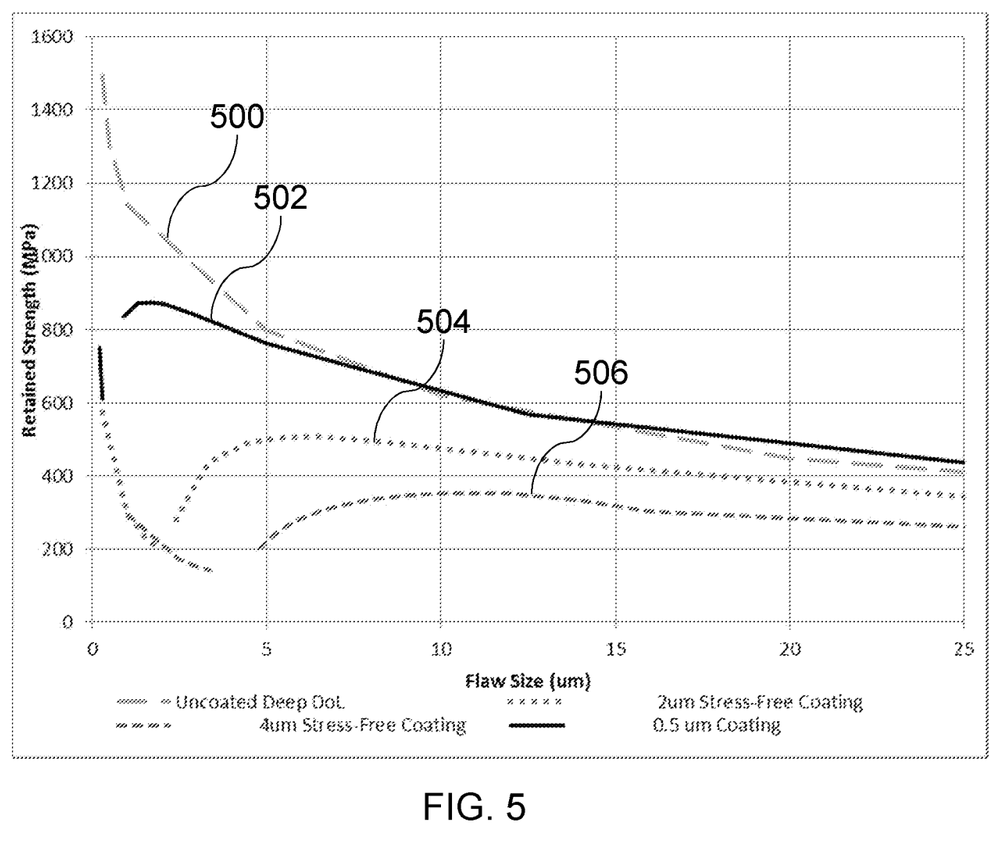
FIG. 5 illustrates a plot of retained strength versus flaw size based on modeling data, according to some embodiments.

FIG. 5 shows modeled R-curves for composite system retained strength (in MPa, along the Y-axis) as a function of flaw depth (in micrometers, or microns, along the X-axis) for three coating thicknesses on chemically strengthened glass compared with uncoated, chemically strengthened glass (long-dashed line, 500). As seen in FIG. 5, from line 500, as flaw size grows in the uncoated sample, the retained strength continuously decreases. In contrast, the modeling data in FIG. 5 demonstrates the apparent rising R-curve behavior (i.e., that as flaw size grows, retained strength increases to a point before decreasing) which provides increased reliability for coated substrates according to one or more embodiments. Three different coating thicknesses were simulated to demonstrate how parameters can be tuned to produce a desired response. All coatings were assumed to be stress-free, and to have the same Young's modulus as the glass-based substrate. In addition, the same residual stress profile was simulated for all three cases: a double ion exchange to achieve a deep DOC, which had a maximum compressive stress on the surface of 900 MPa and a DOC of approximately 80 µm. Trends observed from the chosen ion exchange stress profile will be consistent with other profiles, though the results are not directly transferable. Coating thicknesses of 0.5 micrometers (solid black line, 502), 2 micrometers (dotted line, 504), and 4 micrometers (short-dashed line, 506) all demonstrate the apparent rising R-curve behavior. For example, see: line 502 which rises from the smallest modeled flaw size to a flaw size of about 2 micrometers; line 504 which rises from a flaw size of about 2.5 micrometers to a flaw size of about 5 micrometers; and line 506 which rises from a flaw size of about 4 micrometers to a flaw size of about 10 micrometers. After crack growth initiates in the residual stress-free coating, it immediately propagates to the interface between the coating and the substrate (ion exchanged glass). Once the surface crack crosses into the ion exchanged glass, the strain required to propagate the crack increases, thus arresting the crack until the higher strain requirement is met. In this way, the glass cannot fail due to flaw that is smaller than the maximum stable flaw size. The size of the maximum stable flaw will be a function of the coating properties (thickness and modulus) for a given ion exchange profile. Therefore, the reliability and strength can be optimized for a given application, as shown in the figure. Low thickness coatings have a smaller critical flaw size, but higher strength, while thicker coatings increase the maximum critical flaw size but such may come at the expense of strength. By optimization of coating thickness and Young's modulus of the selected coating, a variety of stress profiles and properties of glass-based articles can be engineered and manufactured.

According to one or more embodiments, the increase or decrease in strength on one side of a glass-based substrate is determined using advanced ring on ring (AROR) testing. The strength of a material is defined as the stress at which fracture occurs. The AROR test is a surface strength measurement for testing flat glass specimens, and ASTM C1499-09(2013), entitled "Standard Test Method for Monotonic Equibiaxial Flexural Strength of Advanced Ceramics at Ambient Temperature," serves as the basis for the AROR test methodology described herein. The contents of ASTM C1499-09 are incorporated herein by reference in their entirety. The glass specimen is abraded prior to ring-on-ring testing with 90 grit silicon carbide (SiC) particles that are delivered to the glass sample using the method and apparatus described in Annex A2, entitled "abrasion Procedures," of ASTM C158-02(2012), entitled "Standard Test Methods for Strength of Glass by Flexure (Determination of Modulus of Rupture). The contents of ASTM C158-02 and the contents of Annex 2 in particular are incorporated herein by reference in their entirety.

Figure 6:
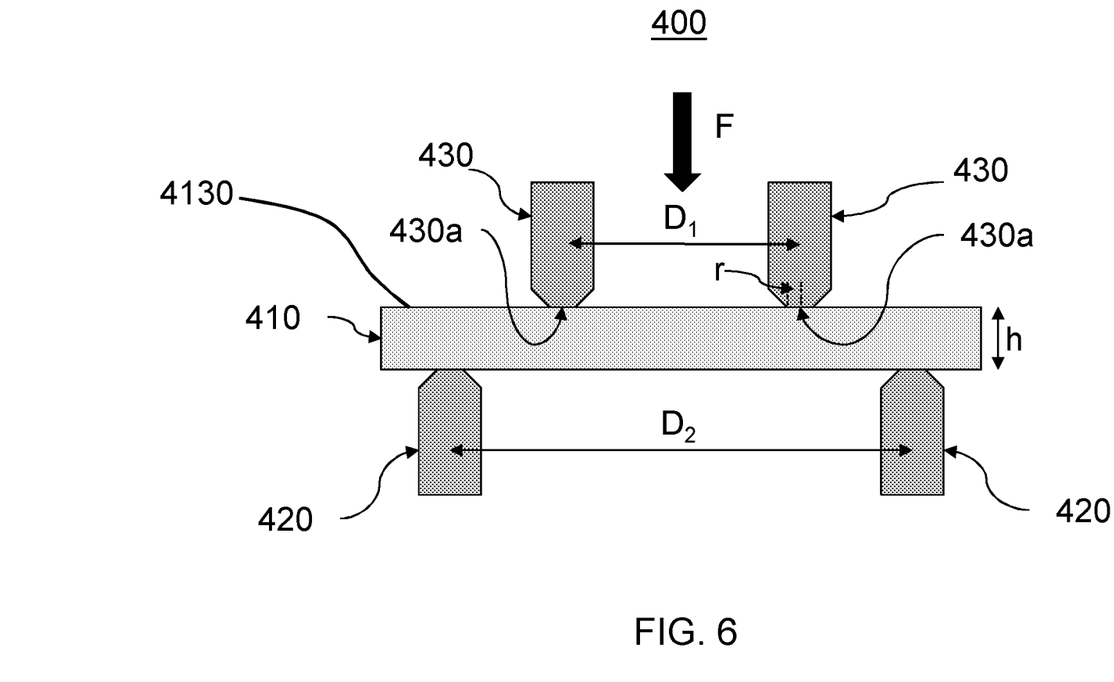
FIG. 6 illustrates a ring on ring testing setup for measuring strength of a substrate.

Prior to ring-on-ring testing a surface of the glass-based article is abraded as described in ASTM C158-02, Annex 2, to normalize and/or control the surface defect condition of the sample using the apparatus shown in Figure A2.1 of ASTM C158-02. The abrasive material is typically sand-blasted onto the surface 4130 of the glass-based article 410 at a load of 103 kPa (15 psi) using an air pressure of 304 kPa (44 psi). After air flow is established, 5 cm$^3$ of abrasive material is dumped into a funnel and the sample is sand-blasted for 5 seconds after introduction of the abrasive material.

For the AROR test, a glass-based article 410 having at least one abraded surface 4130 is placed between two concentric rings of differing size to determine equibiaxial flexural strength (i.e., the maximum stress that a material is capable of sustaining when subjected to flexure between two concentric rings), as shown in FIG. 6. In the AROR configuration 400, the abraded glass-based article 410 is supported by a support ring 420 having a diameter D2. A force F is applied by a load cell (not shown) to a loading ring 430 having a diameter D1 which, in turn, applies force to the surface 4130 of the glass-based article 410.

The ratio of diameters of the loading ring and support ring D1/D2 may be in a range from about 0.2 to about 0.5. In some embodiments, D1/D2 is about 0.5. Loading and support rings 430, 420 should be aligned concentrically to within 0.5% of support ring diameter D2. The load cell used for testing should be accurate to within ±1% at any load within a selected range. Testing is carried out at a temperature of 23±2° C. and a relative humidity of 40±10%.

For fixture design, the radius r of the protruding surface of the loading ring 430, h/2≤r≤3 h/2, where h is the thickness of glass-based article 410. Loading and support rings 430, 420 are made of hardened steel with hardness HRc>40. AROR fixtures are commercially available.

The intended failure mechanism for the AROR test is to observe fracture of the glass-based article 410 originating from the area of contact 430a between the first surface 4230 and the loading ring 430. Failures that occur outside of the region between the loading ring 430 and support ring 420 are omitted from data analysis. Due to the thinness and high strength of the glass-based article 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. AROR testing therefore focuses on peak load at failure as the measured response.

The strength of a glass-based article depends on the presence of surface flaws. However, the likelihood of a flaw of a given size being present cannot be precisely predicted, as the strength of glass is statistical in nature. A probability distribution can therefore generally be used as a statistical representation of the data obtained.

After getting the loads to failure as described in the standard, the loads or the equibiaxial flexural strength are plotted in the form of a Weibull plot (see details at: http://www.itl.nist.gov/div898/handbook/eda/section3/weibplot.htm). The Maximum Likelihood Estimate (MLE) method is used to determine the two parameters of the Weibull distribution: shape and scale parameters. The MLE of the parameters of a statistical model involve maximizing the likelihood or, equivalently, the log likelihood, with respect to the parameters. The parameter values at which the maximum occurs are the MLEs of the model parameters. See Sirvanci, M. and Yang, G. (1984). Estimation of the Weibull parameters under type I censoring, Journal of the American Statistical Association 79, 183-187. The likelihood is a function of the parameters and of the data. If the shape parameters increase, then the reliability is said to be increased (tighter strength distribution). If the scale parameter increases then the strength is said to increase.

Glass-based articles described according to one or more embodiments, in which each side of the glass-based article has a strength and/or reliability that differs from the other side of the article can have a variety of end uses. In one or more embodiments, such glass-based articles include architectural glazings, automotive windshields and glazings, where greater strength may be needed on the outer side of the windshield to resist chips and impacts. On the inner side of a windshield or automotive glazing, a greater reliability (tighter strength distribution) as well as a lower strength may be needed to guarantee that the laminate fails when a person impacts the windshield. According to one or more embodiments, the tighter distribution of strength ensures a low probability that the windshield requires a greater force to break, thereby reducing the chance of injury to the car occupants. According to one or more embodiments, opposing surfaces of glass-based articles can be designed and tailored to have the desired strength and reliability. Similar considerations apply to architectural glazings used in building construction.

Flaw sizes are determined using fractography as follows. Flaw size is determined using fractography by using ASTM Standard : C1322-15 (Standard Practice for Fractography and Characterization of Fracture Origins in Advanced Ceramics) to determine flaw sizes (origin sizes) for samples broken using four-point bend test (ASTM C1161: Standard Test Method for Flexural Strength of Advanced Ceramics at Ambient Temperature) or samples broken using a ring-on-ring test (ASTM C1499-15). This establishes the flaw size distribution for the glass sheet in the intended application. The more samples that are used for the destructive testing, the better the confidence in the flaw size distribution data from testing. Flaw size is determined using strength testing and fracture mechanics analysis. Strength data is obtained using as many samples as is feasible using a suitable strength test (four point bend test for edge strength and ring-on-ring test for surface strength). Using a suitable fracture analysis model (analytical or Finite element analysis), one can estimate the flaw size that must have caused failure of the sample in the strength test. This assumes a particular flaw size, shape, and location and hence the approach is not as accurate as the fractography approach but it is easier to establish flaw populations.

As used herein, the terms "glass-based article" and "glass-based substrates" are used in their broadest sense to include any object made wholly or partly of glass. Glass-based articles include laminates of glass and non-glass materials, laminates of glass and crystalline materials, and glass-ceramics (including an amorphous phase and a crystalline phase). Unless otherwise specified, all compositions are expressed in terms of mole percent (mol %).

Figure 7A:
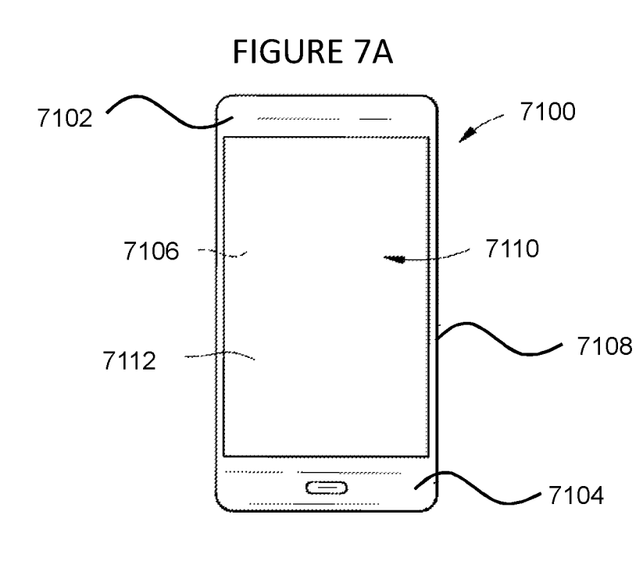
FIG. 7A is a plan view of an exemplary electronic device incorporating any of the strengthened articles disclosed herein.
Figure 7B:
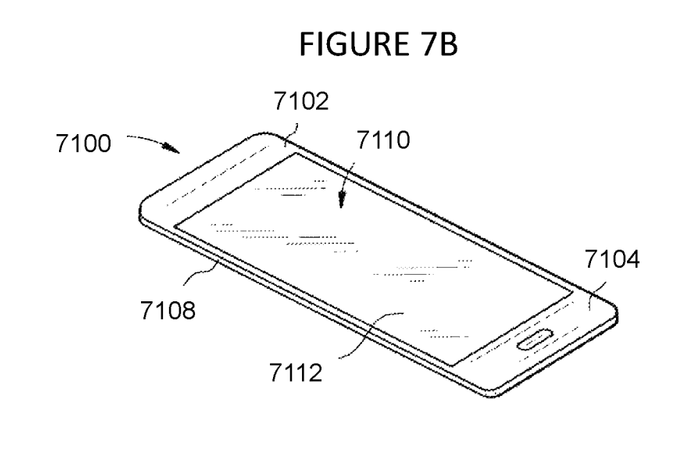
FIG. 7B is a perspective view of the exemplary electronic device of FIG. 7A.

The glass-based articles disclosed herein may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 7A and 7B. Specifically, FIGS. 7A and 7B show a consumer electronic device 7100 including a housing 7102 having front 7104, back 7106, and side surfaces 7108; electrical components (not shown) that are at least partially inside or entirely within the housing and including at least a controller, a memory, and a display 7110 at or adjacent to the front surface of the housing; and a cover substrate 7112 at or over the front surface of the housing such that it is over the display. In some embodiments, the cover substrate 7112 may include any of the strengthened articles disclosed herein. In some embodiments, at least one of a portion of the housing or the cover glass comprises the strengthened articles disclosed herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant.

As used herein, DOC refers to the depth at which the stress within the glass-based article changes from compressive to tensile stress. At the DOC, the stress crosses from a negative (compressive) stress to a positive (tensile) stress and thus exhibits a stress value of zero. According to the convention normally used in the art, compression is expressed as a negative (<0) stress and tension is expressed as a positive (>0) stress. Throughout this description, however, CS is expressed as an absolute value—i.e., as recited herein, CS=|CS|—and thus is not indicated with a negative number. Compressive stress (at the surface of the glass) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

As used herein, the terms "chemical depth", "chemical DOC" and "depth of chemical layer" may be used interchangeably and refer to the depth at which an ion of the metal oxide or alkali metal oxide (e.g., the metal ion or alkali metal ion) diffuses into the glass-based article and the depth at which the concentration of the ion reaches a minimum value, as determined by Electron Probe Micro-Analysis (EPMA). In particular, the depth of $Na_2O$ diffusion or $Na+$ ion concentration may be determined using EPMA and a surface stress meter.

The substrates used herein can be amorphous substrates or crystalline substrates. Amorphous substrates according to one or more embodiments can be selected from soda lime glass, alkali aluminosilicate glass, alkali containing borosilicate glass and alkali aluminoborosilicate glass. In one or more embodiments, the substrate is a glass, and the glass can be strengthened, for example, heat strengthened, tempered glass, or chemically strengthened glass. In one or more embodiments, strengthened glass-based substrates have a compressive stress (CS) layer with a CS extending within the chemically strengthened glass from a surface of the chemically strengthened glass to a compressive stress DOC of at least 10 μm to several tens of microns deep. In one or more embodiments, the glass-based substrate is a chemically strengthened glass-based substrate such as Corning® Gorilla® glass. Examples of crystalline materials include glass-ceramic substrates such as sapphire and spinel ($MgAl_2O_4$).

In strengthened glass-based substrates, there is a stress profile in which there is a compressive stress (CS) on the surface and tension (central tension, or CT) in the center of the glass. According to one or more embodiments, the glass-based substrate can be thermally strengthened, chemically strengthened, or a combination of thermally strengthened and chemically strengthened. As used herein, "thermally strengthened" refers to substrates that are heat treated to improve the strength of the substrate, and "thermally strengthened" includes tempered substrates and heat-strengthened substrates, for example tempered glass and heat-strengthened glass. Tempered glass involves an accelerated cooling process, which creates higher surface compression and/or edge compression in the glass. Factors that impact the degree of surface compression include the air-quench temperature, volume, and other variables that create a surface compression of at least about 68.9 MPa (10,000 pounds per square inch (psi)). Tempered glass is typically four to five times stronger than annealed or untreated glass. Heat-strengthened glass is produced by a slower cooling than tempered glass, which results in a lower compression strength at the surface. Heat-strengthened glass is approximately twice as strong as annealed, or untreated, glass.

Strengthened glass-based substrates may be provided using a variety of different processes. For example, exemplary glass-based substrate forming methods include float glass processes, down-draw processes such as fusion draw and slot draw, up draw, and rolling. A glass-based substrate prepared by a float glass process may be characterized by smooth surfaces as well as by uniform thickness and is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass-based substrate can be cooled further and annealed to reduce internal stress.

Down-draw processes produce glass-based substrates having a uniform thickness that possess relatively pristine surfaces. Because the average flexural strength of the glass-based substrate is controlled by the amount and size of surface flaws, a pristine surface that has had minimal contact has a higher initial strength. When this high strength glass-based substrate is then further strengthened (e.g., chemically), the resultant strength can be higher than that of a glass-based substrate with a surface that has been lapped and polished as typically done on float-glass substrates. Down-drawn glass-based substrates may be drawn to a thickness of less than about 2 mm, for example about 1.5 mm, or about 1 mm, or about 750 microns, or about 500 microns, or about 400 microns, or about 300 microns, or about 200 microns, or about 150 microns, or about 125 microns, or about 100 microns, or about 75 microns, or about 50 microns, or about 25 microns. In addition, down drawn glass-based substrates have a very flat, smooth surface that can be used in its final application without costly grinding and polishing.

The fusion draw process, for example, uses a forming apparatus that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the forming apparatus extend down and inwardly so that they join at an edge below the forming apparatus. The two flowing glass films join at this edge to fuse and form a single flowing glass-based substrate. The fusion draw method offers the advantage that, because the two glass films flowing over the channel fuse together, neither of the outside surfaces of the resulting glass-based substrate comes in contact with the outside surfaces of the forming apparatus. Thus, the surface properties of the fusion drawn glass-based substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region. The surfaces of the glass-based substrate made by a slot-draw process have contacted the slot/nozzle.

In some embodiments, the compositions used for the glass-based substrate may be batched with about 0 to about 2 mol. % of at least one fining agent selected from a group that includes $Na_2SO_4$, NaCl, NaF, NaBr, $K_2SO_4$, KCl, KF, KBr, and $SnO_2$.

Once formed, a glass-based substrate may be strengthened to form a strengthened glass-based substrate. It should be noted that glass-ceramic substrates may also be strengthened in the same manner as glass-based substrates. The glass-based substrate may be chemically strengthened, for example through ion-exchange of larger ions for smaller ions in the surface of the glass-based or glass substrate. However, as discussed above, thermal strengthening methods known in the art, such as thermal tempering or heat strengthening, also may be utilized to strengthen the glass substrates. In some embodiments, the substrates may be strengthened using a combination of chemical strengthening processes and thermally strengthening processes. In some embodiments, the glass-based substrate may be strengthened by forming it as a laminate of a core glass an a clad glass, wherein the core and clad glasses have a different thermal coefficient of expansion. The core and clad glasses are brought together when hot, and are allowed to cool. As the core and clad glasses cool, the difference in their coefficients of thermal expansion form regions of compressive and tensile stress in the glass-based substrate to form a strengthened glass-based substrate.

Examples of glasses that may be used in the substrates may include alkali aluminosilicate glass compositions or alkali aluminoborosilicate glass compositions, though other glass compositions are contemplated. Such glass compositions may be characterized as ion exchangeable. As used herein, "ion exchangeable" means that a substrate comprising the composition is capable of exchanging cations located at or near the surface of the substrate with cations of the same valence that are either larger or smaller in size. One example glass composition comprises $SiO_2$, $B_2O_3$ and $Na_2O$, where ($SiO_2+B_2O_3$)≥about 66 mol. %, and $Na_2O$≥ about 9 mol. %. Suitable glass compositions, in some embodiments, further comprise at least one of $K_2O$, MgO, and CaO. In some embodiments, the glass compositions used in the substrate can comprise about 61 to about 75 mol. % $SiO_2$; about 7 to about 15 mol. % $Al_2O_3$; 0 to about 12 mol. % $B_2O_3$; about 9 to about 21 mol. % $Na_2O$; from 0 to about 4 mol. % $K_2O$; from 0 to about 7 mol. % MgO; and from 0 to about 3 mol. % CaO.

Another example glass composition suitable for the substrates comprises: from about 60 to about 70 mol. % $SiO_2$; from about 6 to about 14 mol. % $Al_2O_3$; from 0 to about 15 mol. % $B_2O_3$; from 0 to about 15 mol. % $Li_2O$; from 0 to about 20 mol. % $Na_2O$; from 0 to about 10 mol. % $K_2O$; from 0 to about 8 mol. % MgO; from 0 to about 10 mol. % CaO; from 0 to about 5 mol. % $ZrO_2$; from 0 to about 1 mol. % $SnO_2$; from 0 to about 1 mol. % $CeO_2$; less than about 50 ppm $As_2O_3$; and less than about 50 ppm $Sb_2O_3$; where about 12 mol. % ($Li_2O+Na_2O+K_2O$) about 20 mol. % and 0 mol. % (MgO+CaO) about 10 mol. %.

Another example glass composition suitable for the substrates comprises: about 63.5 to about 66.5 mol. % $SiO_2$; from about 8 to about 12 mol. % $Al_2O_3$; from 0 to about 3 mol. % $B_2O_3$; from 0 to about 5 mol. % $Li_2O$; from about 8 to about 18 mol. % $Na_2O$; from 0 to about 5 mol. % $K_2O$; from about 1 to about 7 mol. % MgO; from 0 to about 2.5 mol. % CaO; from 0 to about 3 mol. % $ZrO_2$; from about 0.05 to about 0.25 mol. % $SnO_2$; from about 0.05 to about 0.5 mol. % $CeO_2$; less than about 50 ppm $As_2O_3$; and less than about 50 ppm $Sb_2O_3$; where about 14 mol. % ($Li_2O+Na_2O+K_2O$) about 18 mol. %; and about 2 mol. % (MgO+CaO) about 7 mol. %.

In some embodiments, an alkali aluminosilicate glass composition suitable for the substrates comprises alumina, at least one alkali metal and, in some embodiments, greater than about 50 mol. % $SiO_2$, in other embodiments at least about 58 mol. % $SiO_2$, and in still other embodiments at least about 60 mol. % $SiO_2$, wherein the ratio (($Al_2O_3+B_2O_3$)∑modifiers)>about 1, where in the ratio the components are expressed in mol. % and the modifiers are alkali metal oxides. This glass composition, in particular embodiments, comprises: from about 58 to about 72 mol. % $SiO_2$; from about 9 to about 17 mol. % $Al_2O_3$; from about 2 to about 12 mol. % $B_2O_3$; from about 8 to about 16 mol. % $Na_2O$; and from 0 to about 4 mol. % $K_2O$, wherein the ratio(($Al_2O_3+B_2O_3$)∑modifiers)>about 1.

In still other embodiments, the substrates may include an alkali aluminosilicate glass composition comprising: from about 64 to about 68 mol. % $SiO_2$; from about 12 to about 16 mol. % $Na_2O$; from about 8 to about 12 mol. % $Al_2O_3$; from 0 to about 3 mol. % $B_2O_3$; from about 2 to about 5 mol. % $K_2O$; from about 4 to about 6 mol. % MgO; and from 0 to about 5 mol. % CaO, wherein: about 66 mol. %≤$SiO_2$+$B_2O_3$+CaO≤about 69 mol. %; $Na_2O$+$K_2O$+$B_2O_3$+MgO+CaO+SrO>about 10 mol. %; about 5 mol. %≤MgO+CaO+SrO≤ about 8 mol. %; ($Na_2O$+$B_2O_3$)−$Al_2O_3$≤about 2 mol. %; about 2 mol. %≤$Na_2O$−$Al_2O_3$≤about 6 mol. %; and about 4 mol. %≤($Na_2O$+$K_2O$)−$Al_2O_3$≤about 10 mol. %.

In some embodiments, the substrates may comprise an alkali aluminosilicate glass composition comprising: about 2 mol % or more of $Al_2O_3$ and/or $ZrO_2$, or about 4 mol % or more of $Al_2O_3$ and/or $ZrO_2$.

The strengthened substrates described herein may be chemically strengthened by an ion exchange process. In the ion-exchange process, typically by immersion of a glass or glass-ceramic substrate into a molten salt bath for a predetermined period of time, ions at or near the surface(s) of the glass or glass-ceramic substrate are exchanged for larger metal ions from the salt bath. In some embodiments, the temperature of the molten salt bath is from about 400 to about 430° C. and the predetermined time period is about four to about eight hours. The incorporation of larger ions into the glass or glass-ceramic substrate in substitution for smaller ions strengthens the substrate by creating a compressive stress in a near surface region or in regions at and adjacent to the surface(s) of the substrate. A corresponding tensile stress is induced within a central region or regions at a distance from the surface(s) of the substrate to balance the compressive stress. Glass or glass-ceramic substrates utilizing this strengthening process may be described more specifically as chemically-strengthened or ion-exchanged glass or glass-ceramic substrates.

In some embodiments, sodium ions in a strengthened glass or glass-ceramic substrate are replaced by potassium ions from the molten bath, such as a potassium nitrate salt bath, though other alkali metal ions having larger atomic radii, such as rubidium or cesium, can replace smaller alkali metal ions in the glass. According to some embodiments, smaller alkali metal ions in the glass or glass-ceramic can be replaced by Ag+ions to provide an antimicrobial effect. Similarly, other alkali metal salts such as, but not limited to, sulfates, phosphates, halides, and the like may be used in the ion exchange process.

In some embodiments, the strengthened substrate can have a surface compressive stress of about 300 MPa or greater, e.g., about 400 MPa or greater, about 450 MPa or greater, about 500 MPa or greater, about 550 MPa or greater, about 600 MPa or greater, about 650 MPa or greater, about 700 MPa or greater, about 750 MPa or greater or about 800 MPa or greater. In one or more embodiments, the first strengthened substrate can have a compressive stress value in the range of from about 300 MPa to about 1100 MPa, in the range of from about 500 MPa to about 1100 MPa, in the range of from about 600 MPa to about 1100 MPa, in the range of from about 400 MPa to about 1100 MPa, in the range of from about 450 MPa to about 850 MPa, in the range of from about 450 MPa to about 800 MPa, in the range of from about 450 MPa to about 750 MPa. The strengthened glass-based or glass-ceramic-based substrate may have a compressive DOC of about 50 µm or less, for example about 45 µm or less, about 40 µm or less, about 35 µm or less, about 30 µm or less, about 25 µm or less, about 20 µm or less, about 15 µm or less, about 10 µm or less, about 9 µm or less, about 8 µm or less, about 7 µm or less, about 6 µm or less, about 5 µm or less or about 4 µm or less. The lower limit of the compressive depth can be about 0.5 µm, or about 1 µm, or about 2 µm, and/or a central tension in the range of from 0 to about 20 MPa, for example, from about 5 to about 20 MPa, or from about 5 to about 15 MPa, or from about 10 to about 20 MPa, or from about 10 to about 15 MPa, or from about 15 to about 20 MPa. In some embodiments, the glass-based substrate has: a compressive stress value in the range from about 20 MPa to about 300 MPa, and a DOC value in the range of from about 20 µm to about 100 µm; a compressive stress value in the range of from about 300 MPa to about 900 MPa, and a DOC value in the range of from about 2 µm to about 20 µm; or a compressive stress value in the range of from about 500 MPa to about 900 MPa, and a DOC value in the range of from about 2 µm to about 12 µm. In some embodiments, the glass-based substrate has a compressive stress value in the range of from about 400 MPa to about 800 MPa, a thickness in a range of from about 0.05 mm to about 0.7 mm, for example from about 0.1 mm to about 0.6 mm, a DOC value in a range of from about 1 µm to about 20 µm, for example, from about 1 µm to about 15 µm, from about 1 µm to about 14 µm, from about 1 µm to about 13 µm, from about 1 µm to about 12 µm, from about 1 µm to about 11 µm, from about 1 µm to about 10 µm, from about 1 µm to about 9 µm, from about 1 µm to about 8 µm, from about 1 µm to about 7 µm, from about 1 µm to about 6 µm and from about 1 µm to about 5 µm, and a central tension value in a range of from about 0 to about 20 MPa, from about 1 to about 20 MPa, from about 1 to about 19 MPa, from about 1 to about 18 MPa, from about 1 to about 17 MPa, from about 1 to about 16 MPa, from about 1 to about 15 MPa, from about 1 to about 14 MPa, from about 1 to about 13 MPa, from about 1 to about 12 MPa, from about 1 to about 11 MPa, and from about 1 to about 10 MPa.

It will be apparent to those skilled in the art that various modifications and variations can be made to the present disclosure without departing from the spirit and scope of the disclosure. Thus, it is intended that the present invention cover the modifications and variations of this disclosure provided they come within the scope of the appended claims and their equivalents.

What is claimed is:

1. A glass-based article comprising:
a glass-based substrate comprising a first side and a second side opposite the first side, the glass-based substrate comprising a substrate thickness extending from a first interface to a second surface, the glass-based substrate comprising a first outer region extending from the first interface to a depth of compression (DOC), the first outer region having a first outer region compressive stress, and the glass-based article comprises a strengthened glass-based substrate; and
a first coating disposed on the first side of the glass-based substrate providing the first interface between the first coating and the glass-based substrate, the first coating comprising a first coating thickness extending from a first surface to the first interface, the first coating consists of indium tin oxide and/or aluminum oxynitride, the first coating comprising:
a first coating Young's modulus value, wherein the glass-based substrate comprises a substrate Young's modulus value which is less than or equal to the first coating Young's modulus value,
a first coating thickness, and
a first coating stress that is neutral.

2. The glass-based article of claim 1, wherein the glass-based substrate comprises a substrate Young's modulus value which is different than the first coating Young's modulus value.

3. The glass-based article of claim 1, wherein the first coating thickness is in a range of from about 5 nanometers to about 5 micrometers.

4. The glass-based article of claim 1, wherein the glass-based substrate comprises the DOC is in a range of from about 0.05 t to about 0.25 t from the first interface.

5. The glass-based article of claim 4, wherein the first outer region comprises a compressive stress (CS) in a range of from about 100 MPa to about 1100 MPa.

6. The glass-based article of claim 1, wherein the glass-based substrate further comprises:
a central region comprising a tensile stress, the central region extending from the DOC; and
a second outer region extending from the central region, the second outer region comprising a compressive stress.

7. The glass-based article of claim 6, further comprising a second coating on the second outer region, and a second interface at the second outer region and the second coating, the second coating comprising a material comprising a second coating Young's modulus value, a second coating thickness, and a second coating stress that is either neutral or compressive, the absolute value of the second outer region compressive stress is greater than the absolute value of the second coating stress.

8. The glass-based article of claim 7, the absolute value of second coating stress is at least about 40% less than the absolute value of second outer region compressive stress.

9. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and
a cover glass disposed over the display,
at least one of a portion of the housing or the cover glass comprises the glass-based article of claim 1.

10. The glass-based article of claim 1, wherein the DOC is in a range from about 2 µm to about 20 µm.

11. The glass-based article of claim 1, wherein substrate thickness is in a range from about 0.05 mm to about 0.7 mm.

12. The glass-based article of claim 1, wherein the strengthened glass-based substrate is both thermally strengthened and chemically strengthened.

13. The glass-based article of claim 1, wherein the strengthened glass-based substrate is chemically strengthened.

14. The glass-based article of claim 1, wherein the glass-based substrate comprises an ion exchangeable alkali aluminoborosilicate composition.

* * * * *